US009624864B2

(12) United States Patent
Dunn et al.

(10) Patent No.: US 9,624,864 B2
(45) Date of Patent: Apr. 18, 2017

(54) FUEL SYSTEM PROTECTION IN A MULTI-FUEL INTERNAL COMBUSTION ENGINE

(71) Applicant: Westport Power Inc., Vancouver (CA)

(72) Inventors: Mark E. Dunn, Vancouver (CA); Ning Wu, Vancouver (CA); Dehong Zhang, Vancouver (CA); Hamed Karimi-Sharif, Vancouver (CA); Raymond Bzymek, Northville, MI (US)

(73) Assignee: WESTPORT POWER INC., Vancouver (CA)

( * ) Notice: Subject to any disclaimer, the term of this patent is extended or adjusted under 35 U.S.C. 154(b) by 192 days.

(21) Appl. No.: 14/678,694

(22) Filed: Apr. 3, 2015

(65) Prior Publication Data

US 2015/0275813 A1  Oct. 1, 2015

Related U.S. Application Data

(63) Continuation of application No. PCT/CA2013/050757, filed on Oct. 8, 2013.

(Continued)

(51) Int. Cl.
| | | |
|---|---|---|
| *F02D 41/30* | (2006.01) |
| *F02D 19/06* | (2006.01) |
| *F02D 41/00* | (2006.01) |
| *F02D 19/08* | (2006.01) |
| *F02D 41/38* | (2006.01) |
| *F02D 41/22* | (2006.01) |

(52) U.S. Cl.
CPC ....... *F02D 41/3094* (2013.01); *F02D 19/061* (2013.01); *F02D 19/0623* (2013.01);
(Continued)

(58) Field of Classification Search
CPC ............... F02D 41/3094; F02D 41/221; F02D 19/0623; F02D 19/0647; F02D 2041/224
(Continued)

(56) References Cited

U.S. PATENT DOCUMENTS

| | | |
|---|---|---|
| 4,463,734 A | 8/1984 | Akeroyd |
| 4,509,488 A | 4/1985 | Forster et al. |

(Continued)

FOREIGN PATENT DOCUMENTS

| | | |
|---|---|---|
| DE | 102006054463 A1 | 5/2008 |
| DE | 102007050305 A1 | 4/2009 |

(Continued)

OTHER PUBLICATIONS

Search Report issued by EPO on Jul. 1, 2016 in connection with co-pending Europe Application No. 13845933.4.

(Continued)

*Primary Examiner* — Mahmoud Gimie
(74) *Attorney, Agent, or Firm* — Carie C. Mager; C. Larry Kyle

(57) ABSTRACT

A method of protecting a direct injection fuel injector in a multi-fuel engine, the method includes selectively operating the multi-fuel engine with a directly injected fuel introduced through the direct injection fuel injector and a second fuel; when fuelling the multi-fuel engine with the second fuel, selectively commanding a fuel system protection technique when determining that the direct injection fuel injector requires cooling, an age of directly injected fuel is above a predetermined value, transmission status has changed, an engine shutdown event has occurred and a global positioning system signal indicates an engine shutdown event will occur; wherein the fuel system protection technique includes commanding that the directly injected fuel be a portion of total fuel consumed and reducing quantities of the second fuel that is injected so that total fuel consumed equals a desired amount of fuel measured on an energy basis.

20 Claims, 8 Drawing Sheets

Related U.S. Application Data

(60) Provisional application No. 61/711,685, filed on Oct. 9, 2012.

(52) U.S. Cl.
CPC ..... *F02D 19/0647* (2013.01); *F02D 19/0689* (2013.01); *F02D 19/0692* (2013.01); *F02D 19/081* (2013.01); *F02D 41/0025* (2013.01); *F02D 41/0027* (2013.01); *F02D 41/0087* (2013.01); *F02D 41/38* (2013.01); *F02D 2041/224* (2013.01); *F02D 2041/389* (2013.01); *Y02T 10/36* (2013.01)

(58) Field of Classification Search
USPC ....... 123/445, 200, 300, 304, 431, 525, 526; 239/135
See application file for complete search history.

(56) References Cited

U.S. PATENT DOCUMENTS

| | | | |
|---|---|---|---|
| 5,937,800 A | 8/1999 | Brown et al. | |
| 6,561,157 B2 | 5/2003 | Zur Loye et al. | |
| 6,659,071 B2 | 12/2003 | LaPointe et al. | |
| 7,480,556 B2 | 1/2009 | Jauss et al. | |
| 7,832,381 B2 | 11/2010 | Pott et al. | |
| 7,853,397 B2 | 12/2010 | Pott et al. | |
| 8,555,852 B2 * | 10/2013 | Munshi | F02B 43/10 123/27 GE |
| 2008/0017171 A1 | 1/2008 | Stein et al. | |
| 2009/0090332 A1 | 4/2009 | Brehob | |
| 2009/0320774 A1 | 12/2009 | Liebsch et al. | |
| 2012/0174891 A1 | 7/2012 | Marriott et al. | |

FOREIGN PATENT DOCUMENTS

| | | |
|---|---|---|
| EP | 1555417 A2 | 7/2005 |
| WO | 2005031149 A1 | 7/2005 |

OTHER PUBLICATIONS

International Search Report and Written Opinion of the International Searching Authority issued on Nov. 29, 2013, in connection with International Application No. PCT/CA2013/050757.

International Preliminary Report on Patentability and Written Opinion of the International Bureau issued on Apr. 14, 2015, in connection with PCT/CA2013/050757.

\* cited by examiner

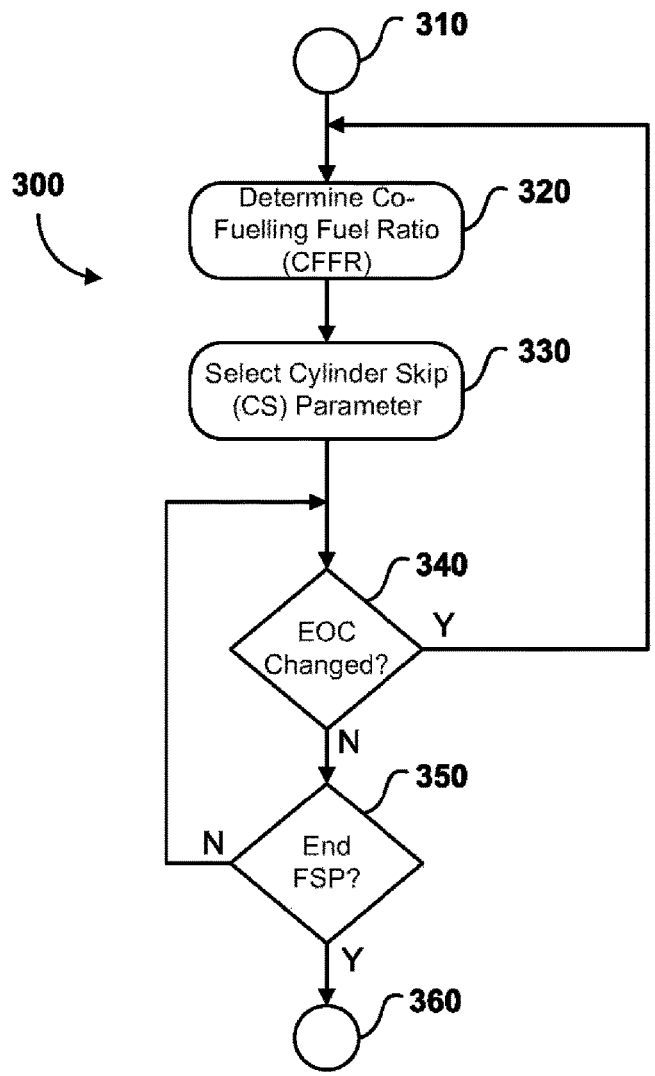
FIG. 2
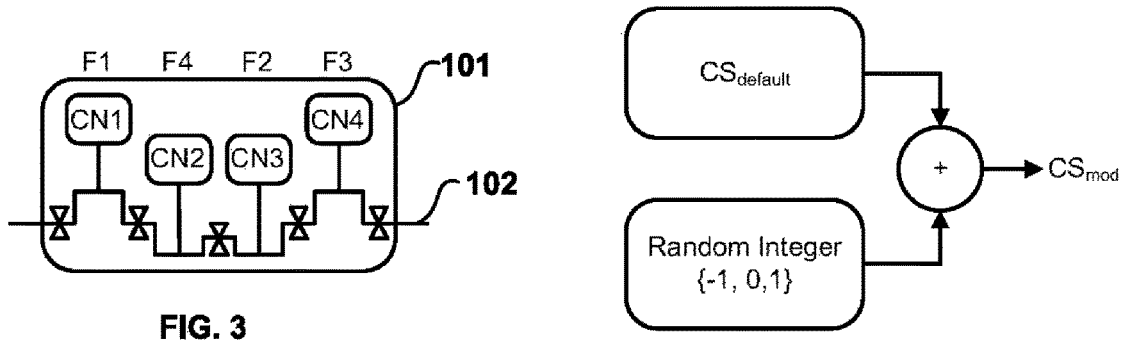
FIG. 3
FIG. 4

FUEL SYSTEM PROTECTION IN A MULTI-FUEL INTERNAL COMBUSTION ENGINE

CROSS-REFERENCE TO RELATED APPLICATIONS

This application is a continuation of International Application No. PCT/CA2013/050757 having a filing date of Oct. 8, 2013, entitled "Fuel System Protection in a Multi-Fuel Internal Combustion Engine", which is related to and claims priority benefits from U.S. provisional patent application No. 61/711,685 filed on Oct. 9, 2012, also entitled "Fuel System Protection in a Multi-Fuel Internal Combustion Engine". This application also claims priority benefits from the '685 provisional application. The '757 international application and the '685 provisional application are each hereby incorporated by reference herein in their entirety.

FIELD OF THE INVENTION

The present application relates to a technique of fuel system protection in a multi-fuel system internal combustion engine that operates in a plurality of fuelling modes.

BACKGROUND OF THE INVENTION

Natural gas is employed as an alternative fuel for vehicles to replace conventional liquid fuels like gasoline and diesel. There are a number of factors motivating the use of natural gas, of which, two are cost and emissions. On an energy equivalent basis natural gas is less expensive than petroleum based fuels. The price of crude oil continues to increase as production continues to outpace discoveries of new oil reserves. In contrast, the reserves of natural gas continue to increase as production lags behind the discovery of new reserves keeping the price well below oil.

Engines fuelled with natural gas produce fewer emissions than engines fuelled with either gasoline or diesel. Due to ever more stringent emission standards engine manufacturers are looking to natural gas to meet these new standards. While the refueling infrastructure for natural gas vehicles is not as extensive as that for conventional liquid fuels, this is a factor that influences adoption of natural gas vehicles especially for consumer automobiles. Access to refueling stations is currently limited to urban areas and main transportation corridors which limits the range of travelling and requires vehicle operators to make planned refueling trips. For these reasons natural gas has had greater adoption in the heavy duty diesel trucking industry since these vehicles typically operate along the natural gas corridor and/or use private refueling facilities. However, due to the above factors motivating the use of natural gas, automobile manufacturers are beginning to integrate natural gas fuel systems alongside existing gasoline fuel systems and to adapt internal combustion engines to be fuelled with more than one fuel, these being referred to in this disclosure as "multi-fuel engines".

In this disclosure, the terms "natural gas" and "gas" are used interchangeably and understood to be preferred examples of a gaseous fuel, but that other gaseous fuels such as ethane, methane, propane, biogas, landfill gas, dimethyl ether, hydrogen and mixtures thereof could also be employed instead of natural gas.

In one such multi-fuel engine there is a direct injection fuel system which introduces liquid fuel directly into combustion chambers, and a natural gas port injection fuel system which introduces natural gas into the intake air upstream of intake valves. In this engine liquid fuel remains dormant in direct fuel injectors that are not being actuated when operating in a port injection natural gas fuelled mode. In this mode, because the nozzles of the direct fuel injectors are located in the combustion chamber it is possible that heat from combustion of port injected fuel elevates the temperature of the liquid fuel inside the direct fuel injectors above a threshold temperature such that the injectors are damaged or carbon deposits begin form. The formation of these carbon deposits leads to fouling of the direct fuel injectors impacting the performance of liquid fuel injection.

In another engine system there are both liquid fuel direct and port fuel injection systems. Depending upon the current operating mode the engine can be fuelled with either the direct or port fuel injection system or both simultaneously. The liquid fuel that is used to fuel the engine and delivered to the direct and port fuel injection systems can be the same fuel or different fuels if the engine is a multi-fuel engine. For example, when the engine starts it is advantageous to fuel from the direct injection system in a stratified charge mode, and when under high load or speed the engine can fuel from the port injection system in a premixed mode. Direct fuel injectors can become fouled when liquid fuel remains dormant inside while operating the engine with fuel from the port injection system.

U.S. Pat. No. 7,853,397, issued on Dec. 14, 2010, to Pott et al. (the '397 patent) discloses a method of operating an internal combustion engine that operates with a conventional liquid fuel such as gasoline or ethanol, injected through a high pressure direct injector, and with gas fuel such as natural gas or liquefied petroleum gas introduced into the intake air manifold or ports. In gas fuel operation there is the risk that the high pressure direct injectors heat up due to the lack of through-put of liquid fuel and are subsequently damaged or the fuel located inside forms deposits which have an adverse effect on injector behavior. To avoid these problems, a load characteristic of the high pressure fuel injector is determined and if this load is above a limit value then switchover to liquid fuel operation is performed, or liquid fuel operation is hooked into gas operation such that the liquid fuel in the high pressure injector is purged and the injector is cooled. Based on engine temperatures (operating parameters) a thermal load upon the fuel injector is retrieved from a weighing characteristic map, which is integrated over time to determine the load characteristic value. The method of the '397 patent does not determine the temperature of the high pressure injector, but instead determines stored energy representing the empirical thermal load upon the injector. As a result, during gas operation liquid fuel may be consumed unnecessarily based on the stored energy value even though the temperature of the fuel injector is below a critical value above which deposits begin to form. The method of the '397 patent also determines the thermal load upon the high pressure injector during gas operation only, but does not continuously determine the thermal load for all fuelling modes (gas operation, liquid fuel operation and mixed fuel operation). That is, during gas operation when determined that the thermal load is above the limit value, liquid fuel is flowed through the high pressure fuel injector to purge fuel and cool the injector. The amount of liquid fuel flowed through the injector is based on a predetermined minimum volume, which is expected to cool the injector, instead of the volume required to reduce the temperature of the fuel injector below the critical value at which deposits begin to form. Again, during gas operation, this results in unnecessary and increased liquid fuel operation.

The state of the art is lacking in techniques for protecting direct injection fuel systems in multi-fuel system engines that reduce or minimize the amount of directly injected fuel that is introduced to protect the direct injection fuel system. Accordingly, for engines that can be fuelled through a direct injection system as well as by means of another fuel system there is a need for an improved method of protecting the direct injection fuel system when operating with the other fuel system.

SUMMARY OF THE INVENTION

An improved method of protecting a direct injection fuel injector in a multi-fuel engine, the method comprising selectively operating the multi-fuel engine with at least one of a directly injected fuel introduced through the direct injection fuel injector and a second fuel; when fuelling the multi-fuel engine with the second fuel, selectively commanding a fuel system protection technique when determining that at least one of the direct injection fuel injector requires cooling, an age of directly injected fuel is above a predetermined value, transmission status has changed, an engine shutdown event has occurred and driving pattern recognition predicts an engine shutdown event will occur; wherein the fuel system protection technique comprises commanding that the directly injected fuel be a portion of total fuel consumed and reducing quantities of the second fuel that is injected so that total fuel consumed equals a desired amount of fuel measured on an energy basis. The second fuel can be a second directly injected fuel, or can be a fumigated fuel. The second fuel can comprise at least one of methane and natural gas. The directly injected fuel can comprise one of gasoline and ethanol-gasoline blends.

When the multi-fuel engine comprises a plurality of cylinders, the fuel system protection technique comprises (a) co-fuelling a cylinder corresponding to an ignition firing event with the directly injected fuel and the second fuel, (b) fuelling cylinders corresponding to a predetermined number of subsequent ignition firing events with the second fuel, and (c) repeating steps (a) and (b).

When the multi-fuel engine comprises a plurality of cylinders, the method further comprises co-fuelling at least a portion of the plurality of cylinders with the second fuel and the directly injected fuel; delaying introduction of the directly injected fuel when a quantity of the directly injected fuel to introduce in an injection event is below a predetermined value; integrating the quantity of the directly injected fuel; and introducing the directly injected fuel when an integrated quantity is greater than the predetermined value. The second fuel quantity to introduce into the cylinder can be adjusted when introduction of the directly injected fuel into the multi-fuel engine is delayed.

When the multi-fuel engine at least operates with the second fuel, the fuel system protection technique comprises selecting an enriched air-fuel ratio; selecting a co-fuelling fuel ratio; and introducing or increasing a quantity of the directly injected fuel into the cylinder to operate at the enriched air-fuel ratio.

An improved apparatus for protecting a fuel system in a multi-fuel engine comprising a direct fuel injector for introducing a directly injected fuel into a combustion chamber of the multi-fuel engine; a second injector for introducing a second fuel; an electronic controller programmed to selectively operate the multi-fuel engine with at least one of the directly injected fuel and the second fuel; when fuelling the multi-fuel engine with the second fuel, selectively command a fuel system protection technique when determining that at least one of the direct injection fuel injector requires cooling, an age of directly injected fuel is above a predetermined value, transmission status has changed, an engine shutdown event has occurred and driving pattern recognition predicts an engine shutdown event will occur; wherein the fuel system protection technique comprises the electronic controller command that the directly injected fuel be a portion of total fuel consumed and reduce quantities of the second fuel that is injected so that total fuel consumed equals a desired amount of fuel measured on an energy basis. The directly injected fuel can be at least one of gasoline and ethanol, and the second fuel can be at least one of methane and natural gas.

When the second fuel is a fumigated fuel and the second injector introduces the fumigated fuel, the apparatus can comprise a fumigation system for introducing the fumigated fuel upstream of an intake valve of the combustion chamber.

When the multi-fuel engine comprises a plurality of cylinders and each cylinder is associated with a combustion chamber, the electronic controller is further programmed to (a) co-fuel a cylinder corresponding to an ignition firing event with the directly injected fuel and the second fuel, (b) fuel cylinders corresponding to a predetermined number of subsequent ignition firing events with the second fuel, and (c) repeat steps (a) and (b).

When the multi-fuel engine comprises a plurality of cylinders, the electronic controller is further programmed to co-fuel at least a portion of the plurality of cylinders with the second fuel and the directly injected fuel; delay introduction of the directly injected fuel when a quantity of the directly injected fuel to introduce in an injection event is below a predetermined value; integrate the quantity of the directly injected fuel; and introduce the directly injected fuel when an integrated quantity is greater than the predetermined value.

When the multi-fuel engine at least operates with the second fuel, the electronic controller is further programmed to select an enriched air-fuel ratio; select a co-fuelling fuel ratio; and introduce or increase a quantity of the directly injected fuel into the cylinder to operate at the enriched air-fuel ratio.

BRIEF DESCRIPTION OF THE DRAWINGS

FIG. 2 is a flow chart view of a fuel system protection technique according to a first embodiment for the internal combustion engine of FIG. 1.

FIG. 3 is a schematic view of a four cylinder engine for illustrating examples of the fuel system protection technique of FIG. 2.

FIG. 4 is a flow chart view of an algorithm for determining a cylinder skip parameter for the fuel system protection technique of FIG. 2.

DETAILED DESCRIPTION OF PREFERRED EMBODIMENT(S)

Figure 1:
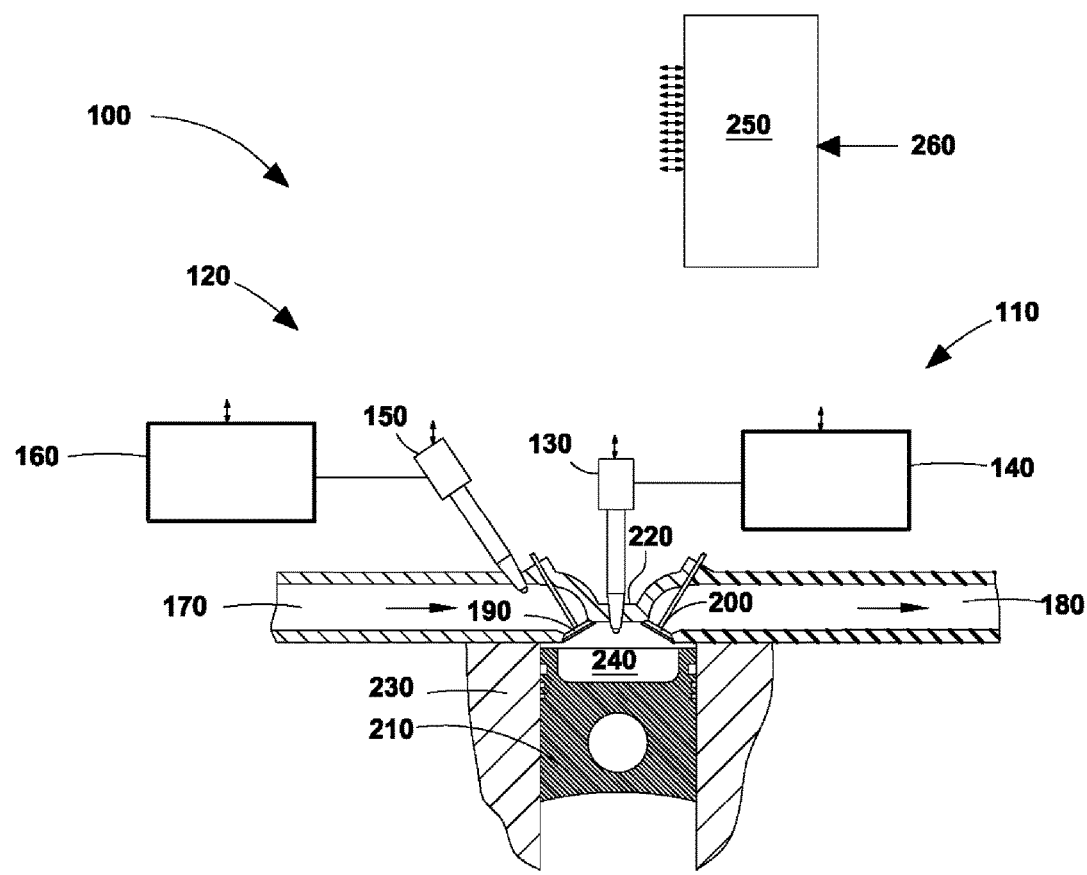
FIG. 1 is a schematic view of an internal combustion engine according to one embodiment of the present fuel system protection technique.

Referring to the schematic view of FIG. 1, there is shown an internal combustion engine 100 comprising a direct injection system 110 and a fumigation system 120. Direct injection system 110 comprises at least one direct fuel injector 130 and fuel supply system 140. Direct fuel injector 130 is shown centrally located in cylinder head 220, which in other embodiments can be side-mounted in a wall of cylinder block 230. Although only one combustion chamber 240 is illustrated, in typical embodiments there is a plurality of combustion chambers, and for each combustion chamber there is a respective direct fuel injector 130.

Fuel supply system 140 supplies fuel to injector 130 and comprises conventional components found in direct injection systems which can vary depending upon whether the directly injected fuel is a liquid fuel or a gaseous fuel. A gaseous fuel is defined as a fuel that is in a gaseous phase at standard temperature and pressure.

Fumigation system 120 comprises conventional components to introduce fuel upstream of intake valve 190. In the illustration of FIG. 1, fumigation system 120 comprises at least one port fuel injector 150 and fuel supply system 160. In embodiments where there is more than one combustion chamber 240, there can be one port fuel injector 150 for each cylinder, or one fuel injector located further upstream in intake manifold 170 can provide fuel for more than one cylinder. In still further embodiments, fumigation system 120 can comprise conventional components other than fuel injectors for introducing fuel upstream of intake valve 190, for example mixers. Fuel supply system 160 supplies fuel to injector 150 and comprises conventional components found in fumigation systems which can vary depending upon whether the fumigated fuel is a liquid fuel or a gaseous fuel.

Engine 100 further comprises exhaust manifold 180. For each cylinder there is an intake valve 190 and an exhaust valve 200. Piston 210 travels within the walls of the cylinder defined by cylinder block 230. Combustion chamber 240 is formed by the space enclosed by the walls of the cylinder, piston 210 and cylinder head 220. Engine 100 further comprises an ignition source (not shown). In a preferred embodiment, engine 100 is spark ignited. In other embodiments, other conventional ignition sources can be employed depending upon system requirements.

Electronic controller 250 communicates with and commands both direct injection system 110 and fumigation system 120 to deliver fuel for combustion in engine 100. Signal wires represented by the symbols with double arrow heads such as those on the left side of electronic controller 250, transmit measured parameters and send command signals for controlling the operation of individual components. Electronic controller 250 can comprise both hardware and software components. The hardware components can comprise digital and/or analog electronic components. In the present example electronic controller 250 comprises a processor and memories, including one or more permanent memories, such as FLASH, EEPROM and a hard disk, and a temporary memory, such as SRAM and DRAM, for storing and executing a program. In another preferred embodiment electronic controller 250 is an engine control unit (ECU) for engine 100.

As used herein, controller 250 is also referred to as 'the controller'. As used herein, the terms algorithm, module, monitor and step refer to an application specific integrated circuit (ASIC), an electronic circuit, a processor (shared, dedicated, or group) and memory that execute one or more software or firmware programs, a combinational logic circuit, and/or other suitable components that provide the described functionality. In preferred embodiments the algorithms, modules and steps herein are part of electronic controller 250.

Engine 100 can operate in multiple fuelling modes comprising a direct injection mode, a fumigated mode and a co-fuelling mode. In the direct injection mode, fuel for combustion in engine 100 is provided by direct injection system 110. In the fumigated mode fuel for combustion in engine 100 is provided by fumigation system 120, however depending upon engine operating conditions it is possible that fuel is also provided by direct injection system 120 as will be explained in detail below. In the co-fuelling mode, fuel for combustion is simultaneously provided by both direct injection system 110 and fumigation system 120. It is possible that engine 100 operates in a manner that it can selectively switch between these modes on a per cycle basis. Injection timing can be predetermined responsive to engine operating conditions determined from measured parameters that are inputted into electronic controller 250, and the input of such parameters among others is represented by arrow 260.

Referring now to FIG. 2, a fuel system protection algorithm that reduces and preferably prevents short term and long term damage to direct fuel injector 130 is shown according to a first embodiment. Algorithm 300 is entered in step 310 when it is determined that a fuel system protection technique is required or desirable to protect direct injection system 110. The determination can be made in several ways, for example by employing a temperature model for direct fuel injector 130, by integrating the number of combustion cycles or the time spent in fumigated fuel mode, and by engine speed and/or load. The temperature model allows an estimation to be made of the temperature of direct fuel injector 130, which has a direct correlation to both short term and long term damage in the injector. For example, the temperature model can be the one disclosed in the Applicant's co-pending U.S. provisional patent application Ser. No. 61/659,704. It is also possible to perform the fuel system protection technique based on other determinations, such as by a fuel monitor for directly injected fuel in fuel supply system 140, detecting a change in transmissions status, an engine shutdown event and driving pattern recognition. The change in transmission status can comprise selection of reverse gear, park, neutral, and in standard transmissions de-clutching. Driving pattern recognition can correlate a certain driving pattern to a shut-down event. For example, employment of a global positioning system (GPS) signal can allow recognition of when the vehicle will be approaching a location where the engine is normally shutdown. This allows proactive measures to be taken to protect direct injection system 110.

The steps of 320 through 360 comprise the fuel system protection technique of cylinder roaming co-fuelling, which along with other fuel system protection techniques disclosed herein can operate to maintain the temperature of direct fuel injector 130 below a predetermined value, and to purge dormant fuel within fuel injector 130 and old fuel from fuel supply system 140 by flowing directly injected fuel from supply system 140 through injector 130 into combustion chamber 240. The technique involves co-fuelling an engine cylinder for one ignition firing event, and repeatedly co-fuelling other engine cylinders after skipping a predetermined number of ignition firing events. By co-fuelling a cylinder which was previously only fuelled with fumigated fuel, the directly injected fuel which has been dormant in injector 130 can be purged by introducing it into the combustion chamber of engine 100 such that cooler fuel enters the injector from fuel system 140 to provide a cooling effect and to cycle fuel through fuel system 140. The co-fuelled cylinders in engine 100 are alternated with the other cylinders such that over time each of the cylinders is co-fuelled at some point. The cylinder roaming co-fuelling technique requires that introduction of the fumigated fuel into specific cylinders can be controlled. In the present embodiment fumigation system 120 enables this approach by utilizing port fuel injectors.

Co-fuelling fuel ratio (CFFR) selected in step 320 according to engine operating conditions represents the ratio of fumigated fuel or directly injected fuel relative to total fuel, and can be stated as the mass fraction of fumigated fuel or the mass fraction of directly injected fuel. The co-fuelling fuel ratio defines the percentage of total fuel which is fumigated fuel and the percentage which is directly injected fuel in the co-fuelling cylinders. Cylinder skip (CS) parameter selected in step 330 represents the number of ignition firing events to skip before co-fuelling another cylinder. As is understood by those familiar with the technology, an ignition firing event is the ignition of fuel within a cylinder. Controller 250 generates a continuous stream of ignition signals that selectively ignite fuel in the cylinders of engine 100 according a predetermined firing order, as will be explained in more detail below. In other embodiments co-fuelling fuel ratio CFFR and cylinder skip CS parameter can be selected from an engine map according to engine operating conditions and/or according to a desired tip temperature. While the technique of cylinder roaming co-fuelling is operated, controller 250 continuously checks whether engine operating conditions have changed in step 340, and when they have the parameters selected in steps 320 and 330 can be adjusted accordingly, or new parameters looked up in engine maps. In step 350 the controller determines whether fuel system protection is still required or desirable, and if not the technique of cylinder roaming co-fueling is ended in step 360. The determination to end fuel system protection can be due to a variety of factors amongst which are the temperature of direct fuel injector 130, a cumulative quantity of directly injected fuel that has been introduced since fuel system protection began in step 310, a cumulative amount of time spent in fuel system protection and a change in engine operating conditions.

Figures 5, 6:
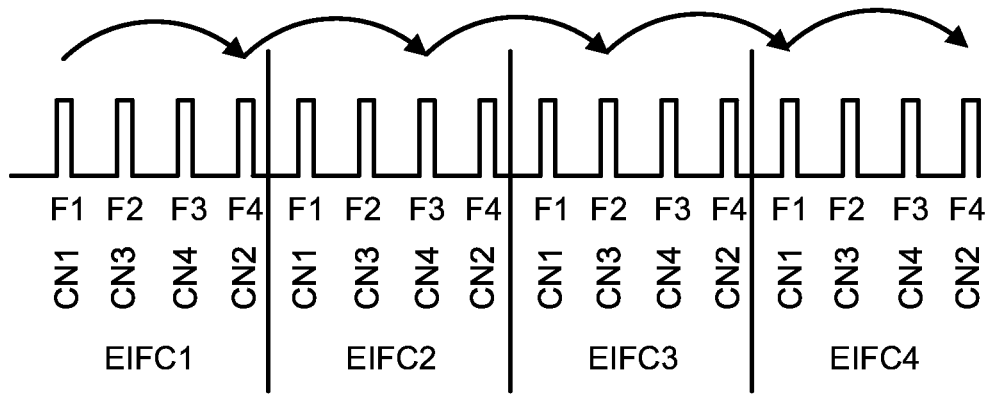
FIG. 5 is a diagrammatic view of an ignition firing event sequence for the internal combustion engine of FIG. 3 according to one example of the fuel system protection technique of FIG. 2.
FIG. 6 is a tabular view of the diagrammatic view of FIG. 5 showing co-fuelled cylinders during each engine ignition firing cycle.

Referring now to FIGS. 3, 5 and 6, but first to FIG. 3, an example cylinder roaming co-fuelling sequence is described for a four cylinder engine. Engine 101 comprises crankshaft 102 operatively connected with cylinders CN1, CN2, CN3 and CN4 such that the firing order of the cylinders is CN1 (F1), CN3 (F2), CN4 (F3), CN2 (F4). That is, the controller repeatedly fires the cylinders (actuates the ignition sources) in this cylinder order, one such cycle is called the engine ignition firing cycle (EIFC) in this disclosure. For a first example, the cylinder skip (CS) parameter selected is 2. With reference to FIGS. 5 and 6, the first co-fuelling cylinder is CN1 during ignition firing event F1 of engine ignition firing cycle EIFC1. During the induction and compression stroke fumigated fuel and directly injected fuel are introduced into cylinder CN1 according to co-fuelling fuel ratio CFFR. The particular timing of directly injected fuel is application and engine load/speed dependent, and can take place during only the induction stroke, during both the induction and compression stroke, or during only the compression stroke. According to the cylinder skip parameter the next two ignition firing events (F2, F3) are skipped for co-fuelling, and the next co-fuelled cylinder is CN2 during ignition firing event F4 of engine cycle EIFC1. Similarly, the next co-fuelled cylinder is CN4 during ignition firing event F3 of engine ignition firing cycle EIFC2, followed by cylinder CN3 during ignition firing event F2 of engine ignition firing cycle EIFC3. The co-fuelling cycle begins to repeat itself in engine ignition firing cycle EIFC4 in this example, such that all cylinders are co-fuelled during three engine ignition firing cycles.

Figures 7, 8:
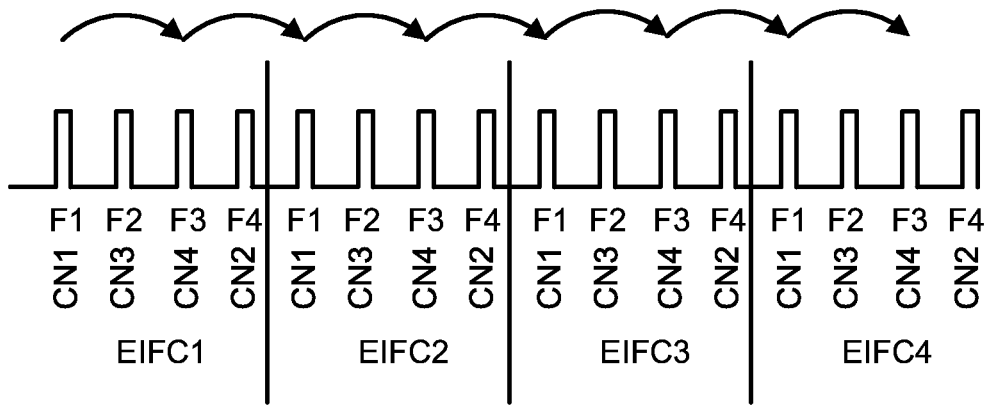
FIG. 7 is a diagrammatic view of an ignition firing event sequence for the internal combustion engine of FIG. 3 according to another example of the fuel system protection technique of FIG. 2.
FIG. 8 is a tabular view of the diagrammatic view of FIG. 7 showing co-fuelled cylinders during each engine ignition firing cycle.

Referring now to FIGS. 7 and 8, another co-fuelling sequence is illustrated for engine 101 where the cylinder skip CS parameter selected is 1. As can be seen in the figures, only cylinders CN1 and CN4 are co-fuelled in each engine ignition firing cycle (EIFC1, EIFC2, EIFC3, EIFC4), and cylinders CN3 and CN2 are not co-fuelled. To avoid this situation cylinder skip CS parameter can be modified after each co-fuelling event according to the algorithm presented in FIG. 4. The modified cylinder skip parameter $CS_{mod}$ is determined by adding a random integer selected from the set $\{-1,0,1\}$ to the default cylinder skip parameter $CS_{default}$. By randomly modifying cylinder skip CS parameter in this way any periodic cylinder roaming co-fuelling sequence that favors some cylinders but not others can be eliminated. This technique of modifying the cylinder skip parameter is also beneficial in co-fuelling sequences like the one illustrated in FIGS. 5 and 6, where even though all cylinders are co-fuelling at some point there is a pattern of firing which may have an associated resonance frequency which can increase engine noise and vibration. By randomly modifying the cylinder shift parameter the effect is to introduce noise into the firing pattern such that the effects of resonance frequency are reduced.

The technique of cylinder roaming co-fuelling is particularly advantageous when the engine is operating in open loop mode where the air-fuel ratio (AFR) is not strictly controlled in a feedback loop. Open loop mode can be entered for a variety of reasons, such as for component protection (turbo or catalyst), or when the engine is outside emission control regions in the engine map. In closed loop mode, the amount of directly injected fuel and fumigated fuel introduced into the co-fuelling cylinder is selected such that the residual oxygen left after combustion is equal to the residual oxygen remaining in other non-co-fuelled cylinders to within a predetermined range of tolerance such that an oxygen sensor in the exhaust path provides a consistent signal to the AFR feedback control algorithm.

Figure 9:
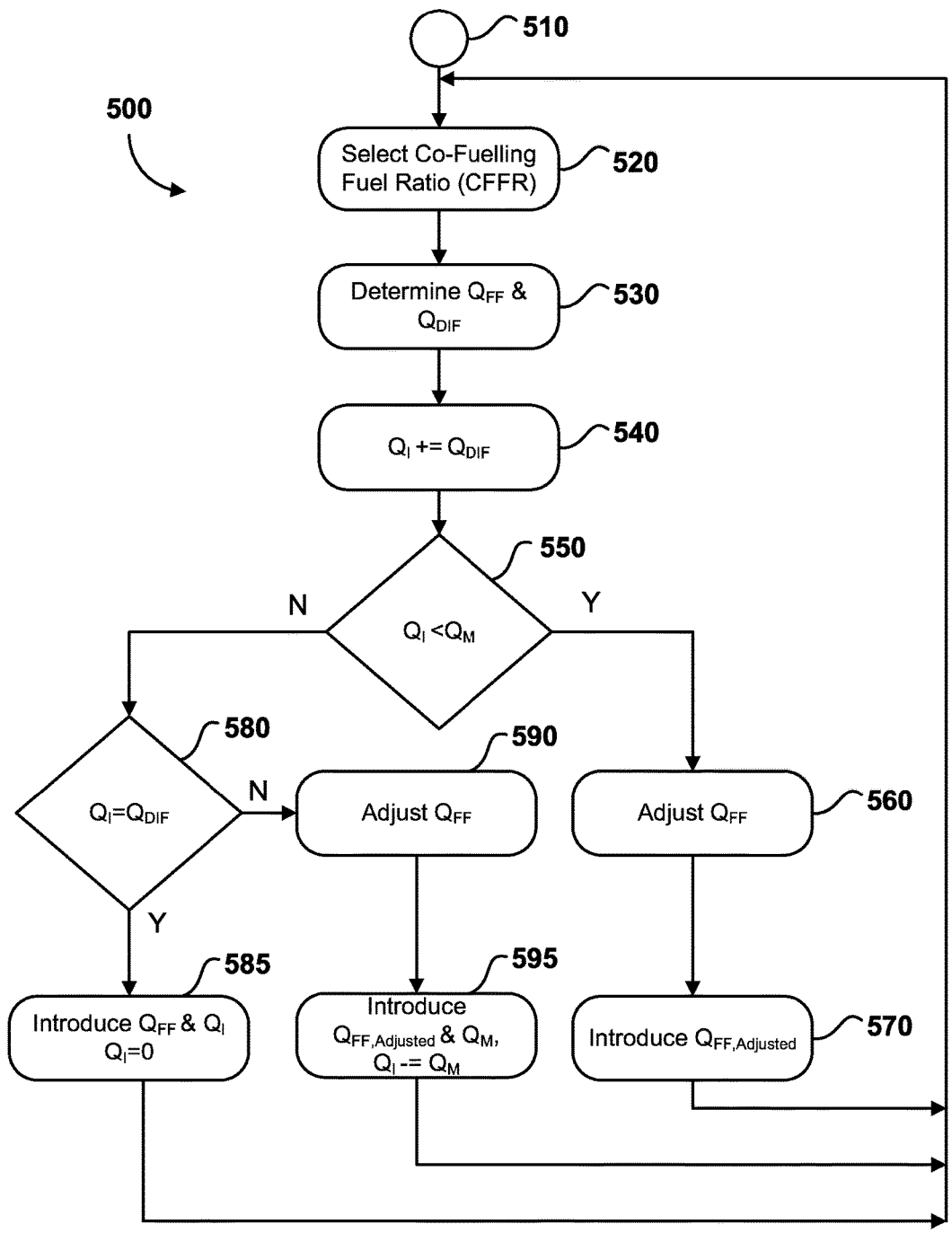
FIG. 9 is a flow chart view of a fuel system protection technique according to a second embodiment for the internal combustion engine of FIG. 1.

Referring now to FIG. 9, a fuel system protection algorithm that reduces and preferably prevents short term and long term damage to direct fuel injector 130 is shown according to a second embodiment. Algorithm 500 is entered in step 510 when determined that a fuel system protection technique is required or desirable to protect direct injection system 110, similar to the embodiment of FIG. 2. The steps of 520 through 595 comprise the fuel system protection technique of skip switching. The technique involves co-fuelling the cylinders with fumigated fuel and directly injected fuel as in the technique of cylinder roaming co-fuelling. However, in the current technique when an injection quantity of directly injected fuel is below a predetermined minimum value, for example as a result of operating in a specific region of the engine map, then introducing directly injected fuel is delayed and the injection quantity is accumulated from cycle to cycle until the accumulation is greater than the predetermined minimum value after which the predetermined minimum value of directly injected fuel is then introduced into the combustion chamber. In the present disclosure, the accumulated quantity of directly injected fuel is referred to as integrated quantity. Co-fuelling fuel ratio (CFFR) is selected in step 520 as a function of engine operating conditions. In step 530 fumigated fuel quantity ($Q_{FF}$) and directly injected fuel quantity ($Q_{DIF}$) are determined as a function of engine operating conditions and the co-fuelling fuel ratio (CFFR). These quantities of fuel are to be introduced into the co-fuelled cylinder as discussed for the embodiment of FIG. 2, according to the technique now described. In step 540, directly injected fuel quantity $Q_{DIF}$ is added to integrated quantity ($Q_I$) which represents a cumulative quantity of directly injected fuel whose introduction to the cylinder has been delayed. The notation "+=" in step 540 is common programming notation that, in step 540, refers to adding the value stored in the variable named $Q_{DIF}$ to the value stored in the variable named $Q_I$ and storing the value in the variable named $Q_I$. Integrated quantity ($Q_I$) is initialized to zero before its first use.

In step 550 integrated quantity ($Q_I$) is compared with predetermined minimum quantity ($Q_M$) which represents the minimum quantity of directly injected fuel that can be injected into the combustion chamber in one injection event. Fuel injectors are conventionally less accurate in the low fuelling region of operation due to a number of factors. If directly injected fuel quantity ($Q_{DIF}$) is in the low fuelling region it is advantageous to store it up over a number of engine cycles until integrated quantity ($Q_I$) is above the predetermined minimum quantity ($Q_M$) before introducing it to the combustion chamber. In step 550, when integrated quantity ($Q_I$) is less than predetermined minimum quantity ($Q_M$) directly injected fuel is not injected during the current engine cycle and control passes to step 560 where fumigated fuel quantity ($Q_{FF}$) is adjusted to equal the total quantity of fuel ($Q_{FF,Adjusted}=Q_{FF}+Q_{DIF}$) on an energy equivalent basis since only fumigated fuel will be introduced into the combustion chamber in the current engine cycle. In step 570 fumigated fuel adjusted quantity ($Q_{FF,Adjusted}$) is introduced into the combustion chamber and control is then returned to step 520 for the next engine cycle.

Returning to step 550, when integrated quantity ($Q_I$) is not less than predetermined minimum quantity ($Q_M$) then both fumigated fuel and directly injected fuel are introduced into the co-fuelled cylinder during the current engine cycle. In step 580 a determination is made as to whether integrated quantity ($Q_I$) represents a cumulative total for the current co-fuelled engine cycle ($Q_I=Q_{DIF}$) or for a number of co-fuelled engine cycles ($Q_I>Q_{DIF}$). When the integrated quantity ($Q_I$) represents a cumulative total for a number of co-fuelled engine cycles control passes to step 590 where the quantity of fumigated fuel is adjusted such that ($Q_M+Q_{FF,Adjusted})=(Q_{DIF}+Q_{FF}$) on an energy equivalent basis. In step 595 minimum quantity ($Q_M$) of directly injected fuel and fumigated fuel adjusted quantity ($Q_{FF,Adjusted}$) are introduced into the combustion chamber. Integrated quantity ($Q_I$) is reinitialized to the difference between its current value and the predetermined minimum value ($Q_I-Q_M$) and control returns to step 320. The notation "−=" in step 595 is common programming notation that, in step 595, refers to subtracting the value stored in the variable named $Q_M$ from the value stored in the variable named $Q_I$ and storing the value in the variable named $Q_I$. By reinitializing integrated quantity to the difference between integrated quantity and minimum quantity the probability of periodic introductions of fumigated fuel and directly injected fuel according step 595 favoring the same cylinder is reduced, which increases the probability of a performing step 595 with a different cylinder the next time.

Returning again to step 580, when integrated quantity ($Q_I$) represents a total for the current co-fuelled engine cycle ($Q_I=Q_{DIF}$) control passes to step 585 where fumigated fuel quantity ($Q_{FF}$) and integrated quantity ($Q_I$) of directly injected fuel are introduced into the combustion chamber. Integrated quantity ($Q_I$) is reinitialized to zero and control returns to step 520. Although the above algorithm has been described as a refinement of the technique of cylinder roaming co-fuelling, the technique of skip switching can be adapted and applied to conventional co-fuelling techniques. The skip switching fuel system protection technique is ended similarly to the embodiment of FIG. 2. When controller 250 determines fuel system protection is no longer required the technique of skip switching is ended.

Figure 10:
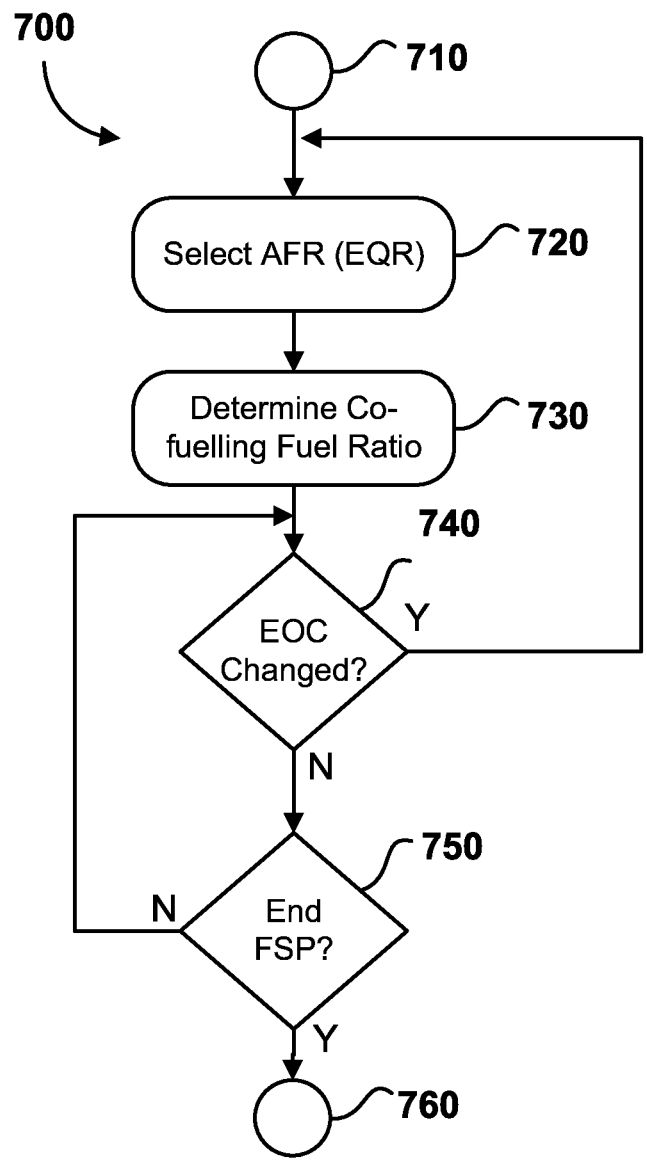
FIG. 10 is a flow chart view of a fuel system protection technique according to a third embodiment for the internal combustion engine of FIG. 1.

Referring now to FIG. 10, a fuel system protection algorithm that reduces and preferably prevents short term and long term damage to direct fuel injector 130 is shown according to a third embodiment. Algorithm 700 is entered in step 710 when determined that a fuel system protection technique is required or desirable to protect direct injection system 110, similar to the embodiment of FIG. 2. The steps of 720 through 760 comprise the fuel system protection technique of selective enrichment. In selective enrichment directly injected fuel is employed to decrease the air-fuel ratio (AFR) and increase the equivalence ratio (EQR). As an example, engine 100 may be running enriched for component protection, such as catalyst protection and turbo protection. Enriching with directly injected fuel has the advantage of increasing the range of fumigated fuel in engine 100 when driven aggressively. In step 720 an enriched air-fuel ratio is selected as a function of engine operating conditions. In some circumstances the enriched air-fuel ratio is already selected since the engine may already be running enriched prior to step 710. In step 730 the co-fuelling fuel ratio (CFFR) is determined as a function of the enriched air-fuel ratio and engine operating conditions. For example, the amount of fumigated fuel selected to be introduced into the cylinder for each combustion cycle is equivalent to the total fuelling quantity required at the current engine operating conditions when engine 100 is not running enriched. After selecting the air-fuel ratio (AFR) and co-fuelling fuel ratio (CFFR) the technique of selective enrichment begins by co-fuelling the cylinders according to these ratios. Engine operating conditions are monitored in step 740, and control is passed back to step 720 upon a change. The controller determines whether fuel system protection is still required or desirable in step 750, and if not the present technique is ended in step 760.

Figure 11:
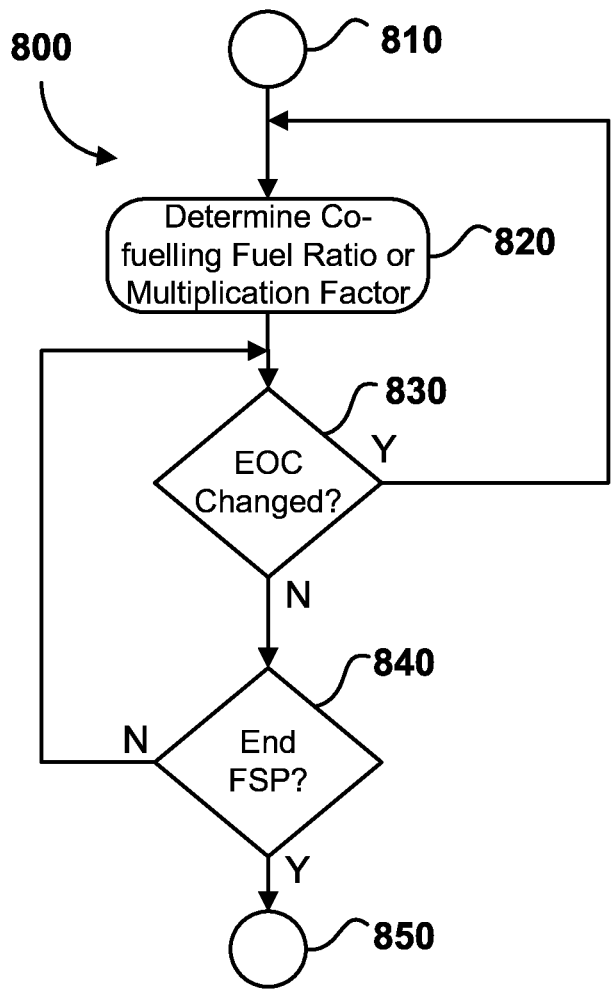
FIG. 11 is a flow chart view of a fuel system protection technique according to a fourth embodiment for the internal combustion engine of FIG. 1.

Referring now to FIG. 11, a fuel system protection algorithm that reduces and preferably prevents short term and long term damage to direct fuel injector 130 is shown according to a fourth embodiment. Algorithm 800 is entered in step 810 when determined that a fuel system protection technique is required or desirable to protect direct injection system 110, similar to the embodiment of FIG. 2. In addition to the embodiment of FIG. 2, a directly injected fuel monitor is employed to determine in step 810 when a fuel system protection technique is required. The fuel monitor tracks the age of directly injected fuel in a fuel vessel in supply system 140. As used herein, "age" is the period of time the fuel has resided in a vessel. After the fuel in the vessel reaches a predetermined age the likelihood that it will be consumed by engine 100 increases (more co-fuelling), independent of the temperature of direct injector 130. The age of the fuel is a function of the time spent in the fuel vessel and the ambient temperature, among other parameters. The fuel monitor tracks the filling and emptying of the fuel vessel, vapor management purging algorithms (when the fuel is a liquid fuel), as well as the ambient temperature and makes a determination of the age of the fuel accordingly. The fuel monitor can also estimate the degradation of directly injected fuel within direct fuel injector 130. The degradation of directly injected fuel in injector 130 is a function of the temperature of the injector. In addition, the fuel monitor can employ a model that estimates the build-up of deposits inside or on the tip of injector 130 based on the injector temperature. Once the fuel inside the injector degrades past a predetermined quality or once deposits build-up past a predetermined amount then the fuel monitor can signal the controller for increased consumption of directly injected fuel. When the signal is due to deposit build-up within or on direct fuel injector 130, the injection pressure for directly injected fuel can be increased to help remove the deposits.

In step 820 the co-fuelling fuel ratio (CFFR) is selected as a function of the age of the directly injected fuel as well as engine operating conditions, after which all cylinders co-fuel. In other embodiments, the other fuel system protection techniques described herein can be employed. As an alternative to selecting a co-fuelling fuel ratio is step 820, a multiplication factor can be selected to apply to existing co-fuelling maps to increase petrol consumption moving it into a control band where a specific petrol consumption is targeted. Engine operating conditions are monitored in step 830, and control is passed back to step 820 upon a change. The controller determines whether fuel system protection is still required or desirable in step 840, and if not the present technique is ended in step 850.

Figure 12:
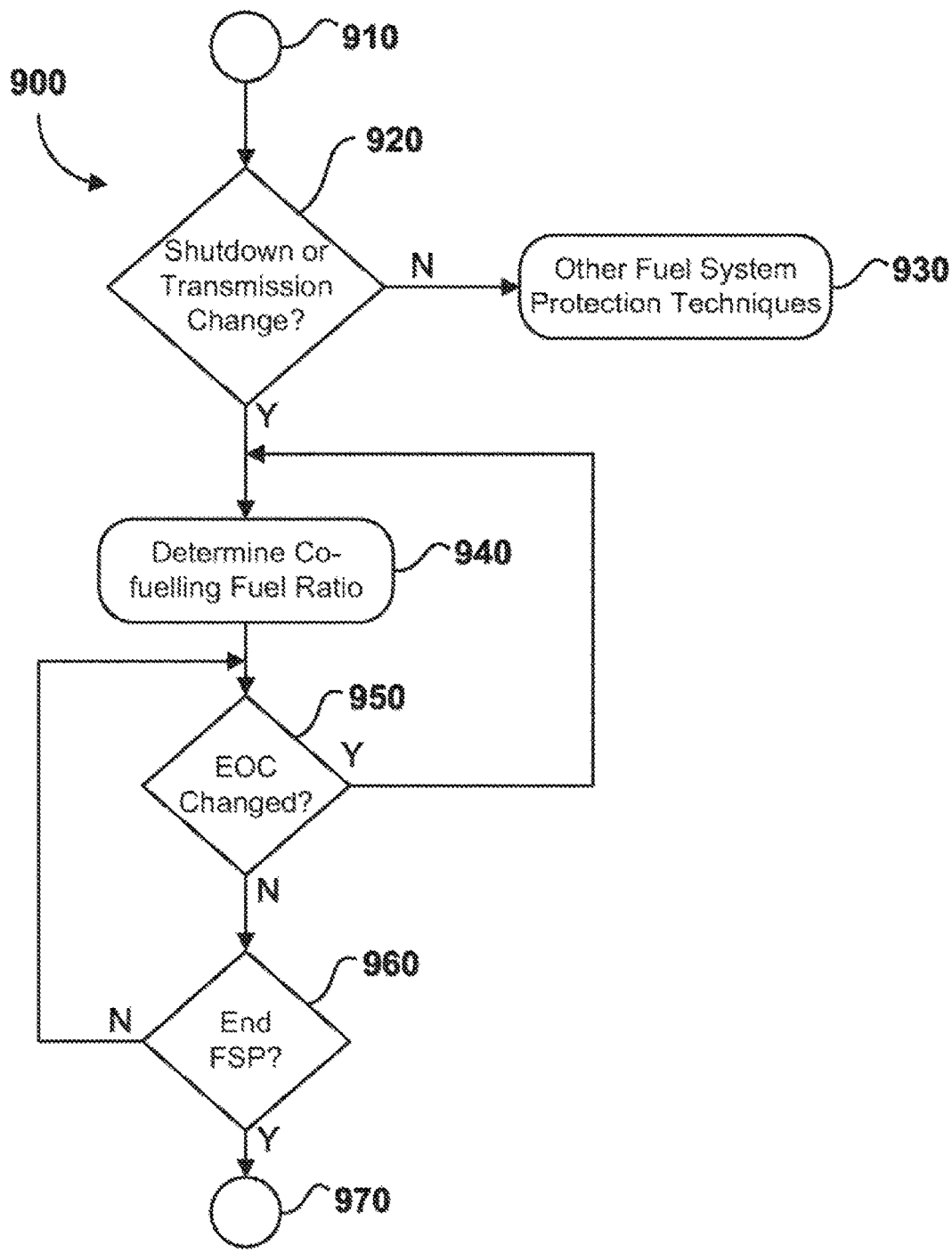
FIG. 12 is a flow chart view of a fuel system protection technique according to a fifth embodiment for the internal combustion engine of FIG. 1.

Referring now to FIG. 12, a fuel system protection algorithm that reduces and preferably prevents short term and long term damage to direct fuel injector 130 is shown according to a fifth embodiment. Algorithm 900 is entered in step 910 when determined that a fuel system protection technique is required or desirable to protect direct injection system 110. In step 920 it is determined whether a shutdown event or a change in transmission status triggered the entry into algorithm 900 from step 910. The change in transmission status can comprise selection of reverse gear, park, neutral, and in standard transmissions de-clutching. Other signals that can trigger entry into algorithm 900 comprise driving pattern recognition that correlates a certain driving pattern to a shut-down event. For example, employment of a global positioning system (GPS) signal can allow recognition of when the vehicle will be approaching a location where the engine is normally shutdown. This allows proactive measures to be taken to protect direct injection system 110. In step 940 the co-fuelling fuel ratio is selected as a function of the specific event that triggered entry into algorithm 900 (shutdown event, pattern recognition, transmission status change). Engine operating conditions are monitored in step 950 such that control is passed back to step 920 upon a change. The controller determines whether fuel system protection is still required in step 960, and if it is not the present technique is ended in step 970.

The fuel system protection techniques described in the embodiments of this disclosure can be selectively combined in other embodiments. In the combined algorithms, the different techniques for fuel system protection can be practiced at predetermined regions of the operating map of engine 100, or can be enabled based on other engine operating parameters such as fuel levels or emission levels. The techniques practiced herein are fully compliant with regulations in the various fuelling modes.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method of protecting a direct injection fuel injector in a multi-fuel engine, said method comprising:
   selectively operating said multi-fuel engine with at least one of a directly injected fuel introduced through said direct injection fuel injector and a second fuel;
   when fuelling said multi-fuel engine with said second fuel, selectively commanding a fuel system protection technique when determining that at least one of said direct injection fuel injector requires cooling based on a temperature model for said direct injection fuel injector, an age of directly injected fuel is above a predetermined value, transmission status has changed, an engine shutdown event has occurred and driving pattern recognition predicts a shutdown event will occur;
   wherein said fuel system protection technique comprises commanding that said directly injected fuel be a portion of total fuel consumed and reducing quantities of said second fuel that is injected so that total fuel consumed equals a desired amount of fuel measured on an energy basis.

2. The method of claim 1, wherein said multi-fuel engine comprises a plurality of cylinders, said fuel system protection technique comprises:
   (a) co-fuelling a cylinder corresponding to an ignition firing event with said directly injected fuel and said second fuel;
   (b) fuelling cylinders corresponding to a predetermined number of subsequent ignition firing events with said second fuel; and
   (c) repeating steps (a) and (b).

3. The method of claim 2, further comprising selecting a co-fuelling fuel ratio.

4. The method of claim 2, further comprising selecting a cylinder skip parameter.

5. The method of claim 4, further comprising:
   selecting a random number; and
   modifying said cylinder skip parameter based on a function of said random number.

6. The method of claim 5, wherein said cylinder skip parameter is modified after co-fuelled ignition firing events.

7. The method of claim 1, wherein said multi-fuel engine comprises a plurality of cylinders, further comprising:
   co-fuelling at least a portion of said plurality of cylinders with said second fuel and said directly injected fuel;

delaying introduction of said directly injected fuel when a quantity of said directly injected fuel to introduce in an injection event is below a predetermined value;

integrating said quantity of said directly injected fuel; and introducing said directly injected fuel when an integrated quantity is greater than said predetermined value.

8. The method of claim 7, further comprising adjusting a second fuel quantity to introduce into said cylinder when introduction of said directly injected fuel into said multi-fuel engine is delayed.

9. The method of claim 7, further comprising adjusting a second fuel quantity to introduce into said cylinder when at least said minimum quantity of directly injected fuel is introduced into said cylinder.

10. The method of claim 1, wherein when said multi-fuel engine at least operates with said second fuel, said fuel system protection technique comprises:

selecting an enriched air-fuel ratio;

selecting a co-fuelling fuel ratio; and introducing or increasing a quantity of said directly injected fuel into said cylinder to operate at said enriched air-fuel ratio.

11. The method of claim 1, where said second fuel is a second directly injected fuel.

12. The method of claim 1, wherein said second fuel is a fumigated fuel.

13. The method of claim 1, wherein said second fuel comprises at least one of methane and natural gas.

14. The method of claim 1, wherein said directly injected fuel comprises one of gasoline and ethanol-gasoline blends.

15. An apparatus for protecting a fuel system in a multi-fuel engine comprising:

a direct fuel injector for introducing a directly injected fuel into a combustion chamber of said multi-fuel engine;

a second injector for introducing a second fuel;

an electronic controller programmed to:

selectively operate said multi-fuel engine with at least one of said directly injected fuel and said second fuel;

when fuelling said multi-fuel engine with said second fuel, selectively command a fuel system protection technique when determining that at least one of said direct injection fuel injector requires cooling based on a temperature model for said direct injection fuel injector, an age of directly injected fuel is above a predetermined value, transmission status has changed, an engine shutdown event has occurred and driving pattern recognition predicts an engine shutdown event will occur;

wherein said electronic controller commands said fuel system protection technique comprising that said directly injected fuel be a portion of total fuel consumed and reduce quantities of said second fuel that is injected so that total fuel consumed equals a desired amount of fuel measured on an energy basis.

16. The apparatus of claim 15, further comprising a fumigation system for introducing a fumigated fuel upstream of an intake valve of said combustion chamber; wherein said second fuel is said fumigated fuel and said second injector introduces said fumigated fuel.

17. The apparatus of claim 15, wherein said multi-fuel engine comprises a plurality of cylinders and each cylinder having a combustion chamber, said electronic controller is further programmed to:

(a) co-fuel a cylinder corresponding to an ignition firing event with said directly injected fuel and said second fuel;

(b) fuel cylinders corresponding to a predetermined number of subsequent ignition firing events with said second fuel; and (c) repeat steps (a) and (b).

18. The apparatus of claim 15, wherein said multi-fuel engine comprises a plurality of cylinders, said electronic controller is further programmed to:

co-fuel at least a portion of said plurality of cylinders with said second fuel and said directly injected fuel;

delay introduction of said directly injected fuel when a quantity of said directly injected fuel to introduce in an injection event is below a predetermined value;

integrate said quantity of said directly injected fuel; and introduce said directly injected fuel when an integrated quantity is greater than said predetermined value.

19. The apparatus of claim 15, wherein when said multi-fuel engine at least operates with said second fuel, said electronic controller is further programmed to:

select an enriched air-fuel ratio;

select a co-fuelling fuel ratio; and introduce or increase a quantity of said directly injected fuel into said cylinder to operate at said enriched air-fuel ratio.

20. The apparatus of claim 15, where said directly injected fuel is at least one of gasoline and ethanol, and said second fuel is at least one of methane and natural gas.

* * * * *